United States Patent Office 3,816,493
Patented June 11, 1974

3,816,493
PROCESS FOR PREPARING ORGANOPOLY-
SILOXANE OILS
Siegfried Nitzsche, Rudolf Strasser, and Robert Leser, Burghausen, and Helmut Spork, Altotting, Germany, assignors to Wacker Chemie GmbH, Munich, Germany
No Drawing. Filed June 23, 1971, Ser. No. 156,108
Claims priority, application Germany, June 23, 1970, P 20 30 936.8
Int. Cl. C07f 7/08
U.S. Cl. 260—448.2 E                                        8 Claims

ABSTRACT OF THE DISCLOSURE

An improved process for equilibrating organopolysiloxanes which comprises passing an inert gas through a catalytic bed which is in contact with the organosiloxanes.

The present invention relates to an improved process for preparing organopolysiloxane oils by equilibrating organosiloxanes containing triorganosiloxy groups in addition to other siloxane units in the presence of catalysts which are solid under the reaction conditions.

Heretofore, it has been known that organopolysiloxane oils may be prepared by equilibrating organosiloxanes in the presence of catalysts which are solid under the reaction conditions. Preparation of organopolysiloxane oils with solid catalysts, that is in a heterogeneous phase, for example, have certain advantages over batch or continuous processes in the preparation of organopolysiloxane oils in a homogeneous phase or at least with liquid or dissolved catalysts. The use of solid catalysts in the preparation of these organopolysiloxane oils avoids removing or deactivating the equilibration catalyst, which is undesirable in the organopolysiloxane oil. The presence of appreciable amounts of catalyst, may under some conditions, reduce the stability of the oil.

When solid catalysts are used in the equilibration of organopolysiloxanes containing Si-bonded hydroxyl groups, water which is produced as a by-product in the equilibration, or water which is present as an impurity in the organosiloxanes to be equilibrated, is absorbed on the catalyst, thereby reducing the activity and ultimately rendering the catalyst inactive. Thus the period of time that the catalyst may be used before regeneration is greatly reduced.

Surprisingly, it has been found that in the continuous preparation of organopolysiloxane oils by equilibration of organopolysiloxanes containing Si-bonded hydroxyl groups with organopolysiloxanes possessing triorganosiloxy groups in the presence of solid catalysts, that when an inert gas is introduced in small amounts into the equilibration vessel, simultaneously with the organopolysiloxane, that the activity of the catalyst remained unchanged even over a long period of operation.

Therefore it is an object of this invention to provide a process for preparing organopolysiloxane oils. Another object of this invention is to provide a process for preparing organopolysiloxane oils in the presence of catalyst which are solid under the reaction conditions. Still another object of this invention is to provide a process for maintaining the activity of the catalyst over a prolonged period of operation. A further object of this invention is to provide a process for equilibrating organopolysiloxanes containing triorganosiloxy groups and other siloxane units.

The foregoing objects and others which will become apparent from the following description are accomplished in accordance with this invention, generally speaking, by providing an improved process for the preparation of organopolysiloxane oils by equilibrating organosiloxanes containing triorganosiloxy groups in addition to other siloxane units, in the presence of catalysts which are solid under the reaction conditions, the improvement which comprises passing a stream of an inert gas through the catalyst bed which is in contact with the organosiloxanes.

Organosiloxanes which contain triorganosiloxy groups in addition to other siloxane units, as well as the cyclic and non-cyclic organosiloxanes which have been used heretofore in the preparation of organopolysiloxane oils may be equilibrated in accordance with the present invention. Examples of organosiloxanes to be equilibrated are, thus, mixtures of organosiloxanes of the general formula $R_3SiO(SiR_2O)_mSiR_3$ and $HO(SiR_2O)_nH$ and/or $(SiR_2O)_p$.

The R radicals which may be the same or different, represent hydrocarbon radicals and substituted hydrocarbon radicals, $m$ is 0 or a number having a value of at least 1, $n$ is a number having a value of at least 1 and $p$ is a number having a value of at least 3. Additional examples of organosiloxanes to be equilibrated are mixed hydrolysis products of silanes of the general formula $R_2SiX_2$ and $R_3SiX$, wherein R is the same as above and X is a hydrolyzable atom or a hydrolyzable group. In addition to triorganosiloxoy groups, other siloxane units, such as RHSiO—, $RSiO_{3/2}$—, $SiO_{4/2}$ and

units, wherein R' is a divalent hydrocarbon radical, for example an alkylene or arylene radical can also be present instead of, or in addition to, the diorganosiloxane units. In most cases, however, siloxane units other than the diorganosiloxane, RHSiO— and triorganosiloxane units are only present in amounts up to about 10 mol percent.

Examples of hydrocarbon radicals represented by R above are alkyl and alkenyl radicals having from 1 to 18 carbon atoms, such as methyl, ethyl, butyl, hexyl, octyl, decyl, octadecyl and vinyl radicals, and aryl radicals, such as the phenyl radical. Examples of substituted hydrocarbon radicals are halogenated hydrocarbon radicals, such as o-, m- and p-chlorophenyl radicals and the 3,3,3-trifluoropropyl radical. Examples of divalent hydrocarbon radicals represented by R' above are ethylene, butylene, pentamethylene, hexamethylene, octamethylene, phenylene and the like.

According to the process of this invention it is thus possible to equilibrate, for example, mixtures of dimethylpolysiloxanes possessing one Si-bonded hydroxyl group on each of the terminal units and hexamethyldisiloxane and/or dimethylpolysiloxanes end-blocked with trimethylsiloxy groups, as well as mixed hydrolysis products from dimethyldichlorosilane, diphenyldichlorosilane and/or phenylmethyldichlorosilane and trimethylchlorosilane, or from methyldichlorosilane and trimethylchlorosilane, or from dimethyldichlorosilane and vinyldimethylchlorosilane.

Although any triorganosiloxy end-blocked organopolysiloxane may be used, it is preferred that hexamethyldisiloxane be used as the organosiloxane to yield trimethylsiloxy groups, since it is easily obtained in the pure form.

The upper limits for $m$, $n$ and $p$ are not critical since very highly polymeric organosiloxanes or crystalline organosiloxanes, can be dissolved in organic solvents to form a solution for the continuous process. In any case the ultimate chain length of the organopolysiloxane oils is only controlled by the ratio of the amounts of triorganosiloxy groups employed to the amount of the remaining siloxane units.

Solid catalysts which may be used in the process of this invention are fuller's earth which can contain up to 20 percent by weight of water, kaolin, active charcoal, aluminum silicates having a molecular sieve structure of the general formula $$0.9 \pm 0.2 \ M_{2/n}O : Al_2O_3 : 2.5 \pm 0.5 \ SiO_2 : YH_2O,$$

wherein M is a cation having a valence of from 1 to 3, such as sodium, n is the valency of M and Y is a value from 0 to 8, acid-activated fuller's earth, sulphonated coal and sulphonated styrene-divinylbenzene copolymer.

Water which is present in the catalyst before equilibration in amounts up to about 20 percent by weight as water of crystallization does not interfere with the catalyst activity.

In order to facilitate the flow of the organosilicon compounds to be equilibrated and the stream of gas through the catalyst bed, it is preferred that the catalyst particles have a diameter of about 0.1 mm. and more preferably from about 0.1 to 5 mm. in diameter.

The process according to the invention can be carried out under conditions which have heretofore been employed in the preparation of organopolysiloxane oils by equilibration of organosiloxanes containing triorganosiloxy groups in addition to other siloxane units. Generally the pressure may range from that of the surrounding atmosphere, that is from about 680 to 800 mm. Hg (absolute), or the hydrostatic pressure of the liquid column present in the equilibration vessel. The temperature may range from about 25 to 200° C. and more preferably from about 75 to 125° C. Preferably, the process is carried out under the hydrostatic pressure of the liquid column present in the equilibration vessel, and at a temperature of from about 90 to 115° C.

The contact time of the siloxanes on the solid catalyst may range from about ½ to 20 hours.

The process according to the invention can be carried out batch-wise or in a continuous manner. It is preferably carried out continuously, for example in a reaction tower, because continuous processes are the most efficient.

Any inert gas may be used in the process of this invention. Suitable examples of inert gases which may be employed are air, nitrogen, argon, hydrogen and carbon dioxide. However, there is the possibility that organosiloxanes may be crosslinked oxidatively, therefore gases which are more inert than air towards organosiloxanes are preferred.

The volume of gas employed in this process is preferably from about 0.05 to 1.5 liters per liter of the equilibration vessel contents per hour based on the pressure of the surrounding atmosphere at 20° C. If the process is continuous, the volume of gas preferably passed through the catalyst bed, measured at the pressure of the surrounding atmosphere and at 20° C., is thus 0.5 to 20 times, preferably from 1 to 10 times the volume of the oragnosiloxanes or of their solutions which are passed to the equilibration vessel. Since the volume of the organosiloxanes passed to the equilibration vessel per unit time is very low, the above mentioned amounts of gas are also very low. If less than 0.05 liter of gas is employed per liter of equilibration vessel per hour, the catalyst activity declines rapidly. However, if more than 1.5 liters of gas are employed per liter of equilibration vessel per hour, then undesirable abrasion of the catalyst often occurs.

The stream of inert gas employed according to the invention contributes only partially or insignificantly to the removal of water from the equilibration vessel. Surprisingly, however, it prevents the absorption of water on the catalyst, without interfering with the desired contact of the organosiloxanes with the catalyst.

Preferably, the stream of gas is introduced into the equilibration vessel in as finely dispersed form as possible, for example, by means of a glass frit (glass dispersion stone), at one or more points, and, if the process is continuous, in the same direction of flow as the siloxanes.

The gas stream issuing from the equilibration vessel can be passed through a condenser to remove substances which boil above 20° C./760 mm. Hg (absolute) and thereafter recycled to the equilibration vessel.

The substances which are removed from the gas streams in the above mentioned condenser can be recycled to the equilibration vessel after removing the water, for example by decantation, thereby resulting in no loss of organosiloxanes. The products thus removed from the gas stream are primarily cyclic siloxanes and when solvents are employed, the products consist of cyclic siloxanes and solvents. Surprisingly, the proportion of hexamethyldisiloxane, if organosiloxanes containing trimethylsiloxy groups have been employed as organosiloxanes containing triorganosiloxy groups in addition to other siloxane units, is very low in the gas stream, even though water and hexamethyldisiloxane have almost the same boiling point.

Where the viscosity of the organosiloxanes employed and the organopolysiloxane oils to be prepared is less than 5,000 cs./25° C., the equilibration can be carried out in the absence of solvents. However, if the viscosity of the organosiloxanes employed and/or the organopolysiloxane oils to be prepared is above about 5,000 cs./25° C., solvents must be used. Where solvents are necessary, then the same solvents may be used which have been employed heretofore in the preparation of organopolysiloxane oils by the equilibration process. Examples of suitable solvents are hydrocarbons, such as benzene and toluene, halogenated hydrocarbons, such as methylene chloride and carbon tetrachloride, and also ethers, such as di-n-butyl ether. Although the amount of solvent is not critical, it is preferred that a sufficient amount of solvent be used to provide a solution in the equilibration vessel which does not exceed about 500 cs./25° C.

Various embodiments of this invention are further illustrated in the following examples in which all parts are by volume unless otherwise specified.

EXAMPLE 1

About 166.8 parts/hour of a dimethylpolysiloxane containing one Si-bonded hydroxyl group in each of the terminal units, and having a viscosity of about 100 cs. at 25° C. are mixed with about 6.84 parts/hour of hexamethyldisiloxane and recycled organosilicon compounds, and about 1,600 parts/hour, measured at about 720 mm. Hg (absolute) and 20° C., of nitrogen which is passed through a glass frit, are pumped, from the lower narrow side of a tower, through a tower maintained at a temperature of from about 105 to 115° C. The tower which is about 1,200 mm. high and has an internal diameter of 50 mm., and a volume of about 1,800 ccs. is filled with granular fuller's earth which contains 6 to 7 percent by weight, of water, and has a particle diameter of 0.6 to 1.4 mm.

The gases evolved from the upper narrow side of the tower is passed through a descending condenser cooled with tap-water, whereby about 0.75 parts/hour of water and 1.25 parts/hour of organosilicon compounds condensate are removed. The organosilicon condensate is decanted from the water and recycled to the equilibration tower. Investigation by gas chromatography shows that the organosilicon compounds separated from the gas stream contain about 5 percent by weight of hexamethyldisiloxane, with the remainder being cyclic dimethylpolysiloxanes.

The stream of oil which issues just below the upper narrow side of the tower is passed through a thin layer evaporator operated at about 180° C. and at 1 mm. Hg (absolute). At the head of the thin layer evaporator, 0.75 parts/hour of water and 28.8 parts/hour of organosilicon compounds are withdrawn, the latter consisting only of cyclic dimethylpolysiloxanes which are also recycled to the equilibration tower and about 172 parts/hour of dimethylpolysiloxane end-blocked by trimethylsiloxy groups, of 100 cs. at 25° C., are withdrawn as the residue.

Even after 2,000 hours no decline in the activity of the catalyst is observed in the process described above. If, for comparison, an inert gas is not used, the catalyst has to be regenerated, by heating to above 140° C., after only 100 hours.

Example 2

About 75 parts/hour of a mixture containing about 98.8 percent by volume of a dimethylpolysiloxane containing one Si-bonded hydroxyl group on each of the terminal units and having a viscosity of about 100 cs. at 25° C., and about 1.2 percent by volume of hexamethyldisiloxane dissolved in 24.7 parts/hour of toluene, mixed with recycled organosilicon compounds and recycled toluene, and 650 parts/hour of nitrogen, measured at about 720 mm. Hg (absolute) and 20° C., which are passed through a glass frit, are pumped from the lower narrow side of the tower, through a tower which is maintained at a temperature of from about 105 to 115° C. The tower which is about 1,200 mm. high and has an internal diameter of about 50 mm., and a volume of about 1,800 ccs. is filled with granular fuller's earth which contains 6 to 7 percent by weight of water, and has a particle diameter of 0.6 to 1.4 mm.

The gases evolved from the upper narrow side of the tower are passed through a descending condenser cooled with tap-water whereby about 0.36 parts/hour of water and about 18.6 parts/hour of a mixture of organosilicon compounds and toluenes condensate are removed. After decanting the water, this mixture is recycled to the equilibration vessel and, according to gas chromatography analysis contains only 0.6 percent by weight of hexamethyldisiloxane.

The stream of oil which issues just below the upper narrow side of the tower is passed through a thin layer evaporator operated at about 180° C. and at 1 mm. Hg (absolute). About 0.36 parts/hour of water and 28.7 parts/hour of a mixture of cyclic dimethylpolysiloxane and toluene, which is free of hexamethyldisiloxane are withdrawn from the head of the thin layer evaporator and about 74.5 parts/hour of dimethylpolysiloxane end-blocked with trimethylsiloxy groups having a viscosity of about 750 cs. at 25° C., are withdrawn as residue.

The invention claimed is:

1. An improved process for preparing organopolysiloxane oils by equilibrating organosiloxanes containing triorganosiloxy groups in addition to other siloxane units in the presence of equilibrating catalysts which have a particle size of from about 0.1 to about 5.0 mm. in diameter and are solid at temperatures up to 200° C., the improvement which comprises passing a stream of an inert gas through the catalyst bed which is in contact with the organosiloxanes.

2. The process of claim 1, wherein nitrogen is used as the inert gas.

3. The process of claim 1, wherein the volume of gas measured at the pressure of the surrounding atmosphere and at 20° C. which is passed through the catalyst bed is from 0.5 to 20 times the volume of the equilibration mixture which is passed through the equilibration vessel.

4. The process of claim 1, wherein the catalyst bed is selected from the group consisting of fuller's earth, kaolin, active charcoal, aluminum silicates, acid-activated fuller's earth, sulphonated coal and sulphonated styrene-divinylbenzene copolymer.

5. The process of claim 1, wherein the organosiloxanes are dissolved in a hydrocarbon solvent.

6. The process of claim 1, wherein the organosiloxanes to be equilibrated may be represented by the formulae $R_3SiO(SiR_2O)_mSiR_3$, $HO(SiR_2O)_nH$, $(SiR_2O)_p$ and mixtures thereof, in which R represents hydrocarbon and substituted hydrocarbon radicals, $m$ has a value of from 0 to at least 1, $n$ is a number having a value of at least 1 and $p$ is a number having a value of at least 3.

7. The process of claim 6, wherein the organosiloxanes to be equilibrated also contain mixed hydrolysis products of silanes of the general formula $R_2SiX_2$ and $R_3SiX$ in which R represents hydrocarbon and substituted hydrocarbon radicals and X is a hydrolyzable group.

8. The process of claim 6, wherein the organosiloxanes to be equilibrated include recycled cyclic siloxanes.

References Cited
UNITED STATES PATENTS

| | | | |
|---|---|---|---|
| 3,234,179 | 2/1966 | Katchman et al. | 260—448.2 E X |
| 3,332,973 | 7/1967 | Merker | 260—448.2 E |
| 3,479,316 | 11/1969 | Levene | 260—448.2 E X |

DANIEL E. WYMAN, Primary Examiner

P. F. SHAVER, Assistant Examiner

U.S. Cl. X.R.

260—46.5 R